United States Patent Office 3,522,139
Patented July 28, 1970

3,552,139
REINFORCED RUBBER OR PLASTIC ARTICLE
Glyn B. Redmond, Birmingham, England, assignor to The Dunlop Company Limited, London, England, a British company
No Drawing. Filed July 24, 1968, Ser. No. 747,109
Claims priority, application Great Britain, Aug. 3, 1967, 35,595/67
Int. Cl. B29h 9/04; B32b 25/00
U.S. Cl. 161—144                          15 Claims

ABSTRACT OF THE DISCLOSURE

A reinforcement for a flexible article of high stiffness and long fatigue life comprising steel wires embedded in a sheathing matrix of material of lower modulus than that of the steel wires and of higher modulus than that of the material of the flexible article.

---

This invention relates to reinforced rubber or plastic article.

It is well-known to reinforce rubber or plastic articles by means of textile components and these components may be in the form of steel wire cords comprising wires of the order of $6/1000$ of an inch in diameter.

Economy of material may be achieved by reducing the number of wires in each cord and increasing the diameter of each wire, or greater stiffness may be achieved by retaining the number of wires and increasing the diameter of each wire. However, either expedient normally reduces the fatigue life of each cord and consequently may reduce the useful life of the reinforced article, since reinforced rubber or plastic articles are generally subjected to repeated bending.

It is an object of the present invention to provide reinforced rubber or plastic articles incorporating reinforcements of high stiffness and long fatigue life.

According to the present invention there is provided a reinforced rubber or plastics article comprising a reinforcement of cables, cords, strands or composite monofilamentary structures the individual metal wires of which are embedded in a sheathing matrix of material of lower modulus than that of the metal of the individual wires and of higher modulus than that of the surrounding embedding rubber or plastics material of the reinforced article, the sheathed reinforcement being embedded in rubber or plastics material.

By modulus is meant the static elastic modulus measured at a low rate of strain, and is given by the slope of the tangent to the initial linear portion of the load per unit area versus extension per unit length curve.

Although the wires referred to hereafter are of circular cross-section, said condition is not a requisite of the invention and wires of elliptical, square, triangular, rectangular, diamond or irregular cross-section may be employed to some advantage in some cases.

Preferably the sheathing matrix is a plastics material and comprises Nylon 66, polyester, or polyvinyl chloride.

Alternatively, the sheathing matrix may be metallic and may comprise copper or brass.

It is preferable that when the sheathing matrix is metallic it is annealed.

Preferably the wires of the reinforcement are of steel.

The diameter of each individual wire of the reinforcement may be less than 0.01 of an inch and preferably they lie within the range 0.004 of an inch to 0.0005 of an inch.

A plurality of wires may be embedded within a sheathing matrix to form a composite monofilamentary structure and the wires may or may not be subsequently twisted together.

A plurality of composite monofilamentary structures may be twisted together to form a strand, and the strand so formed may or may not be embedded within a sheathing matrix.

A plurality of strands may be twisted together to form a cord and the cord so formed may or may not be embedded within a sheathing matrix.

A plurality of cords may be twisted together to form a cable and the cable so formed may or may not be embedded within a sheathing matrix.

Either the composite monofilamentary structures, the strands, the cords, or the cables may be arranged in side-by-side parallel relationship to form a reinforcement sheet.

Said reinforcement sheet may be used as reinforcement for rubber or plastics articles to replace the conventional ply reinforcements, for example, as used in tyres or conveyor belts.

Embodiments of the invention will now be described in more detail by way of example.

According to a first embodiment of the invention, a radial ply pneumatic tyre for a motor car is provided with a breaker assembly comprising four breaker plies, each ply comprising rubberised cords arranged in parallel side-by-side relationship and disposed at an angle of substantially 25° to the mid-circumferential plane of the tyre, the cords of successive plies being disposed in opposed relationship with respect to the said plane of the tyre. Each cord comprises steel wires embedded in a copper sheathing matrix. The cords are produced by the following method.

A rod of steel of appropriate metallurgical properties, e.g. purity and carbon content, suitable to provide the uniformity, ultimate tensile strength and modulus required in the final product, is embedded in a sheath of ductile copper also of a high standard of purity. The sheathed steel rod is then drawn through a series of dies of gradually reducing diameter to reduce the diameter of the rod and sheath and the assembly is then subjected to an annealing process to anneal both the rod and the sheath. The process of drawing and annealing is then repeated a number of times further to reduce the diameter of the rod and sheathing and a number of drawn sheathed rods are then sheathed together, also with ductile copper; the assembly is further drawn and annealed as before so as to reduce all of the individual steel rods to form steel wires of a mean diameter of approximately $1/1000$ of an inch. The assembly is finally annealed so as substantially to restore the ductility of the sheathing matrix and leave substantially unaffected the drawn wires. The final drawn composite monofilamentary structure comprises 36 steel wires embedded in a copper sheathing matrix. The composite monofilaments are brass plated to improve the adhesion between the composite monofilaments and rubber. Three such composite monofilamentary structures are twisted together with a Z form of twist of 3 turns per inch to form a strand, and seven such strands are twisted together with an S form of twist of 3 turns per inch to form a cord.

According to a second embodiment of the invention, a pneumatic tyre for a motor car is provided with a single carcass ply reinforcement comprising rubberised cords arranged in side-by-side and parallel relationship and disposed at an angle of substantially 90° to the mid-circumferential plane of the tyre. Each cord comprises steel wires embedded in a sheathing matrix of Nylon 66. The cords are produced by the following method.

A group of 250 previously drawn or extruded steel wires each of a mean diameter of approximately $1/1000$ of an inch are passed through the head of a cross-head extruder charged with Nylon 66 and a nylon sheathing matrix formed thereon to yield a composite monofilamentary structure of mean diameter of approximately 20/1000 of an inch. The composite monofilamentary structure so formed is twisted about its own axis with an S form of twist of eight turns per inch, immediately after issuance from the extruder, while the nylon is soft and the wires warm. Two such twisted composite monofilaments are folded together with a Z twist of eight turns per inch to provide a helix angle of about 25°. The cords so formed are rubberised and arranged in side-by-side and parallel relationship. The cords are rubberised by the following method.

The unvulcanised natural rubber coating composition is dissolved in petroleum naphtha to form a solution containing approximately 10 parts by weight of dry rubber per 100 parts by weight of petroleum naphtha. To said rubber solution is added sufficient $4\text{-}4^1\text{-}4^{11}$ tri-isocyanate triphenyl methane (Desmodur R—registered trademark) to produce 1 part by weight of dry isocyanate.

The cords are immersed in the above-mentioned solution and are allowed to dry below the boiling point of petroleum naphtha i.e. below 100° C.

According to a third embodiment of the invention, a flexible polyvinyl chloride conveyor belt is provided with a reinforcement comprising polyvinyl chloride coated cables arranged in side-by-side and parallel relationship, and disposed at substantially 0° to the longitudinal axis of the belt. The cables comprise steel wires embedded in a Nylon 66 sheathing matrix. The cables are produced in the following manner.

36 previously drawn or extruded steel wires each of a mean diameter of approximately 1/1000 of an inch are bunched together and passed through the head of a cross-head extruder charged with Nylon 66 and a sheath of nylon applied thereto. The mean diameter of the composite monofilamentary structure formed thereby is approximately 9/1000 of an inch. Seven such composite monofilaments are twisted together while the nylon is still soft and the steel wires warm with an S form of twist of 2.7 turns per inch to form a strand, seven such strands are twisted together with a Z form of twist of 2 turns per inch to form a cord, and seven such cords are twisted together with an S form of twist of 1.3 turns per inch to form a cable.

The cable is coated with flexible polyvinyl chloride by the following method.

A solution comprising 100 parts by weight of polyvinyl chloride (plastisol grade), 35 parts by weight of trialkyl phosphate and 0.70 part by weight of tertiary butyl perbenzoate is perpared and stabilised by processes well-known in the art. The cable is immersed in the above-mentioned solution and heated to 130° C. to allow the mixture to gel.

The polyvinyl chloride coated cables are arranged in side-by-side parallel relationship and are now in a condition to accept a layer of flexible polyvinyl chloride to produce the finally reinforced conveyor belt.

Having now described my invention, what I claim is:

1. A reinforced flexible article provided with reinforcement elements, each element comprising a composite monofilamentary structure consisting of a plurality of metal wires embedded in a single sheathing matrix wherein each individual wire is sheathed by the sheathing material, the sheathing material being of lower modulus than the metal of the individual wires and of higher modulus than the surrounding embedding material of the reinforced article.

2. A reinforced article according to claim 1 wherein the sheathing matrix comprises a plastics material.

3. A reinforced article according to claim 2 wherein the sheathing matrix comprises Nylon 66.

4. A reinforced article according to claim 1 wherein the sheathing matrix comprises a metal and is annealed.

5. A reinforced article according to claim 4 wherein the sheathing matrix comprises copper.

6. A reinforced article according to claim 1 wherein the individual metal wires comprise steel wire.

7. A reinforced article according to claim 6 wherein the mean diameter of the steel wire lies within the range 0.004 of an inch to 0.0005 of an inch.

8. A reinforced article according to claim 1 wherein the article is reinforced by a plurality of composite monofilaments twisted together to form strands.

9. A reinforced article according to claim 8 wherein the article is reinforced with a plurality of strands twisted together to form cords.

10. A reinforced article according to claim 9 wherein the article is reinforced with a plurality of cords twisted together to form cables.

11. A reinforced article according to claim 8 wherein the reinforcement, strands, cords or cables are themselves embedded in a sheathing matrix.

12. A reinforced article according to claim 1 wherein the composite monofilamentary structures, or strands, cords or cables made therefrom are arranged in side-by-side and parallel relationship in the form of sheets.

13. A reinforced article according to claim 12 wherein the article is reinforced with a plurality of said sheets disposed one on top of the other.

14. A reinforced article according to claim 1 comprising a natural rubber pneumatic tyre.

15. A reinforced article according to claim 1 comprising a flexible polyvinyl chloride conveyor belt.

References Cited

UNITED STATES PATENTS

| | | | |
|---|---|---|---|
| 2,414,822 | 1/1947 | Lindsay et al. | 152—359 XR |
| 2,563,113 | 8/1951 | Hindin et al. | |
| 2,897,098 | 7/1959 | Homer et al. | 57—153 |
| 2,930,105 | 3/1960 | Budd | 57—153 XR |
| 3,064,414 | 11/1962 | Ando | 57—153 XR |
| 3,273,978 | 9/1966 | Paul | 57—153 XR |
| 3,277,564 | 10/1966 | Webber et al. | 29—419 |
| 3,378,999 | 4/1968 | Roberts et al. | 57—139 |

STANLEY N. GILREATH, Primary Examiner

W. H. SCHROEDER, Assistant Examiner

U.S. Cl. X.R.

57—153; 74—237; 152—356